Patented Aug. 18, 1931

1,819,221

UNITED STATES PATENT OFFICE

YVON BRANCART, OF VERRERIES DE FAUQUEZ, RONQUIERES, BELGIUM

TREATMENT OF CAST GLASS SHEETS AND PLATES

No Drawing. Application filed February 14, 1930, Serial No. 428,392, and in Belgium February 14, 1929.

This invention relates to the manufacture of cast glass plates and sheets. Its object is to avoid the formation, on the upper side of such plates, of undulations which necessitate the long smoothing and polishing process usually resorted to in order to obtain perfectly smooth and even plates.

As it is well known, these undulations are caused by the unequal cooling and contraction of the two sides of the plate while the latter is being cast, the lower side cooling and contracting rapidly in contact with the casting table, whereas the upper side, having kept more plastic, buckles slightly owing to the contraction of the lower side.

Now it has been found possible, according to the present invention, to cool the two faces of the glass plate almost equally and to get rid of practically any undulation, by rolling the upper side of the plate by means of an impressing roller at the moment of casting, so as temporarily to increase its cooling surface by impressing thereon projections and depressions of a determined height or depth which, when the glass has sufficient plasticity, disappear at once, leaving an even surface without undulations. Preferably, the roller is cooled inside by a flow of water and it is rotated at a somewhat higher speed than if it were simply rolling on the plate, in order slightly to drive the glass back in the direction of its rotation. It is immaterial whether the roller is moving relatively to the table or whether the latter is moving relatively to the roller.

The impressions on the roller may be of any shape and size: its surface may be either circumferentially or longitudinally channelled or undulated, checkered, lozenged, dotted or provided with any other regular or irregular pattern, in hollow or in relief.

The impressing roller according to the invention may be used as a calibrating roller, and it then acts simultaneously to give the glass plate the desired thickness and to prevent the formation of undulations on the surface of the same.

In order that good results may be obtained by the use of the impressing roller without being limited to a particular temperature and degree of plasticity of the glass, I may in some cases subject the glass to a smoothing action before allowing same to set. In such cases, immediately after having been treated by the impressing roller, the upper side of the glass plate or sheet is rolled out by means of one or more smooth rollers, which level down those prints that have not disappeared by themselves from the surface of the glass. For instance, a pair of such rollers may be used, one being arranged behind the other at a small distance and, in some cases, it may be convenient to roll the glass out again by means of a third even roller, which is independent of the two first ones. These various smooth rollers may be cooled by water circulation if necessary.

When use is made of a casting table movable relatively to the casting guide plate and to the impressing roller, the said pair of even rollers may be mounted stationary behind the impressing roller, whereas the independent even roller is movable on the table so as to roll the glass plate out from end to end after it has been passed under the impressing roller and the pair of even rollers. In case the casting table is stationary and the printing roller is made to roll upon it, the even rollers may be coupled with the latter so as to follow it in its displacements and level down the surface of the glass after it has passed thereover.

The glass plates and sheets produced by the present process are so even that a slight polish is sufficient to give them the smooth and shiny appearance that hitherto was only obtainable by grinding off a considerable thickness of glass in the smoothing and polishing operations. The invention thus permits the saving of a large amount of material and of long and expensive operations.

I claim:

1. In a process of producing glass plates and sheets, casting molten glass on a flat surface, rolling the fluid glass at such a rate that the glass is slightly driven back, simultaneously forming temporary impressions in the exposed side of such glass, said impressions running in a substantially longitudinal direction, and allowing said impressions to be evened up while the glass cools.

2. In a process of producing glass plates and sheets, casting molten glass on a flat surface, subjecting the fluid glass to the action of an impressing roller adapted to form therein temporary impressions running longitudinally of its direction of travel, driving said roller at a higher circumferential speed than if it were simply rolling on the table to simultaneously form temporary impressions extending at an angle to the first named impressions, and allowing said impressions to be evened up while the glass cools.

3. In a process of producing glass plates and sheets, casting molten glass on a flat surface, rolling the glass by means of an impressing roller, regulating the speed of rotation of said roller, thus forming in the plastic glass temporary impressions running both longitudinally and transversely of the surface of the glass, and successively subjecting the glass to the action of a pair of smoothing rollers and finally to the action of a third independent smoothing roller.

YVON BRANCART.